Patented May 20, 1941

2,243,033

UNITED STATES PATENT OFFICE 2,243,033

COLORED PIGMENT

Carl J. Harbert, Shaker Heights, Ohio, assignor to The Harshaw Chemical Company, Elyria, Ohio, a corporation of Ohio No Drawing. Application January 12, 1939, Serial No. 250,526

11 Claims. (Cl. 106—36.2)

This invention relates to a ceramic color and particularly to a pink body or underglaze stain.

The principal object of the inventon is to produce a color of the type indicated which will fire to a strong, clean pink and which is substantially free from undesirable fluxing properties and which is not productive of undesirable shrinkage on firing. This and other objects are achieved by firing together, in suitable proportions, certain manganese and aluminum compounds, together with a small amount of a suitable fluoride material.

If 16 parts by weight of manganese carbonate and 84 parts by weight of aluminum hydrate are calcined at 900° C. to 1100° C., batch temperature for one hour, under neutral or moderately oxidizing conditions, the project is a brownish material which as a body or underglaze stain fires out to a white. If, however, 16 parts manganese oxide, 84 parts aluminum oxide and 2 parts $CaF_2$ are fired under the same conditions, a similar brownish material is produced which fires to a strong, clean pink color as a body or underglaze stain. The manganese-aluminum composition, accordingly, may be said to be "fluoride activated" to a strong pink color.

The conditions and proportions requisite to obtaining a strong, clean color in ceramic material may be varied. The proportion of manganese carbonate may be from 5 to 25 per cent with a preferred range of 10 to 20 per cent and an optimum of approximately 16 per cent, all proportions being by weight. The $CaF_2$ may be from 1 to 5 per cent with a preferred range of 2 to 4 per cent and an optimum of approximately 3 per cent. The remainder is $Al(OH)_3$ when only essential materials are used. The temperature of calcination may be from 850° C. to 1250° C., the preferred range being from 900° C. to 1100° C. batch temperature. The time of heating at or above the specified temperatures may be from 1 to 5 hours, preferably one hour for small batches, e. g., 10 pounds, and 2 or 3 hours for larger batches, e. g., 100 pounds. The materials should be substantially free from impurities.

Instead of manganese carbonate, I may use a manganese oxide or other manganese compound yielding a manganese oxide or a mixture of manganese oxides under the conditions of calcination. The manganese salts of strong mineral acids are inferior and the salts of weak acids and organic manganese compounds are much to be preferred. I may use $Al_2O_3$, although the hydrate is much better.

Cryolite, aluminum fluoride, manganese fluoride, magnesium fluoride and zinc fluoride, or mixtures of two or more thereof, may be substituted, in whole or in part, for $CaF_2$ within the indicated range of proportions and fairly good colors obtained. However, $CaF_2$ gives very markedly better results than these other fluorides, particularly in the strength of the color developed. It is to be understood that the pink color is developed only in the ceramic body and that the pigment is of a brownish color. This material is, however, called a pink because it becomes pink when used as a body or underglaze stain.

It is obvious that the batch percentages will vary according to the materials used. In general, a desirable range of proportions is such that the proportion of manganese oxide in the calcination product is within the range of 5% to 20% of the aluminum oxide or from 4 to 20 times as much aluminum oxide as manganese oxide by weight.

The following examples from actual practice will serve to illustrate the principle of the invention:

Example I

Manganese carbonate 16 pounds, aluminum hydrate 82 pounds and calcium fluoride 2 pounds were ball milled for 7 hours, calcined together, in a moderately oxidizing atmosphere, at 1000° C., batch temperature, the batch being brought to 1000° C. in about 3 to 6 hours, held at 1000° C. for one hour, giving a brownish material which as a body stain developed a good, strong, clean, pink color.

This example using the materials indicated or substituting a manganese oxide and/or $Al_2O_3$ constitutes the present preferred manner of practicing the invention.

Example II

A good pink was obtained by calcining a mixture of 20 parts manganese carbonate, 75 parts $Al(OH)_3$ and 5 parts $CaF_2$ at 1300° C. for 1 hour. (In this example all conditions are like Example 1 except as otherwise specified.)

By repeating Example II at successively lower temperatures, it was found that 1000° C. is productive of best results.

Following the conditions of Example I except as to temperature, good results can be had by calcining at 850° C. up to 1300° C. The preferred temperature range is 900° C. to 1100° C. Best results have been obtained at about 1000° C.

I am aware that prior to my invention, a phosphate activated manganese-aluminum pink has been used. It does not, however, develop the strength of color which I am able to obtain with the fluoride activated composition, and, furthermore, it possesses an undesirable fluxing action, produces high shrinkage, and the phosphate has to be used in relatively large proportions.

While I have made use of specific examples in describing my invention, I do not wish to be limited to such examples but only in accordance with the appended claims.

Having thus described my invention, what I claim is:

1. A pigment material capable of developing a pink color as a body or underglaze stain, the same being the product of calcining a batch containing oxy-compounds of manganese and aluminum capable of yielding the respective oxides on calcination, and one or more fluorides, the proportions of manganese, aluminum and fluorine in the materials making up said batch being as in the following:

| | Parts by weight |
|---|---|
| $MnCO_3$ | 5 to 25 |
| $CaF_2$ | 1 to 5 |
| $Al(OH)_3$ | 94 to 74 |

2. A pigment material capable of developing a pink color as a body or underglaze stain, the same being the product of calcining a batch containing oxy-compounds of manganese and aluminum capable of yielding the respective oxides on calcination, and $CaF_2$, the proportions of manganese, aluminum and fluorine in the materials making up said batch being as in the following:

| | Parts by weight |
|---|---|
| $MnCO_3$ | 10 to 20 |
| $CaF_2$ | 2 to 4 |
| $Al(OH)_3$ | 88 to 76 |

3. A process of making a pigment material capable of developing a pink color as a body or underglaze stain, comprising calcining in a non-reducing atmosphere at a temperature from 850 to 1250 degrees centigrade a batch containing oxy-compounds of manganese and aluminum capable of yielding the respective oxides, and one or more fluorides, the proportions of manganese, aluminum and fluorine in the materials making up said batch being as in the following:

| | Parts by weight |
|---|---|
| $MnCO_3$ | 5 to 25 |
| $CaF_2$ | 1 to 5 |
| $Al(OH)_3$ | 94 to 70 |

4. A process of making a pigment material capable of developing a pink color as a body or underglaze stain, comprising calcining in a non-reducing atmosphere at a temperature from 850 to 1250 degrees centigrade a batch containing oxy-compounds of manganese and aluminum capable of yielding the respective oxides, and $CaF_2$, the proportions of manganese, aluminum and fluorine in the materials making up said batch being as in the following:

| | Parts by weight |
|---|---|
| $MnCO_3$ | 10 to 20 |
| $CaF_2$ | 2 to 4 |
| $Al(OH)_3$ | 88 to 76 |

5. A pigment material as recited in claim 1 further characterized in that one or more fluorides selected from the group consisting of calcium fluoride, cryolite, aluminum fluoride, manganese fluoride and zinc fluoride are employed.

6. A process as defined in claim 3 further characterized in that one or more fluorides selected from the group consisting of calcium fluoride, cryolite, aluminum fluoride, manganese fluoride and zinc fluoride are employed.

7. A ceramic body having at least a portion thereof colored by a pigment according to claim 1.

8. A ceramic body having at least a portion thereof colored by a pigment according to claim 2.

9. A pigment material, being a calcination product of a manganese oxide yielding material other than a manganese salt of a strong mineral acid, aluminum hydrate and a minor quantity of calcium fluoride, manganese oxide being present to the extent of from 5% to 20% of the aluminum oxide.

10. A pigment material capable of developing a pink color when used as a body or under glaze stain, being a calcination product of a minor proportion of calcium fluoride and a major proportion of oxy-compounds of manganese and aluminum, said material containing manganese and aluminum oxides in the ratio of approximately 4 to approximately 20 times as much aluminum oxide as manganese oxide by weight.

11. Process of making a pigment material capable of developing a pink color when used as a body or underglaze stain, comprising the step of firing an intimate mixture of 5 to 20 per cent by weight of a manganese oxide or equivalent weight of material capable of yielding a manganese oxide on calcination, other than a salt of a strong mineral acid, 2 to 4 per cent of a fluoride material, the remainder being essentially a compound of the class consisting of aluminum hydrate and aluminum oxide, the firing being carried out at a temperature from 850° C. to 1300° C. in a non-reducing atmosphere for from 1 to 5 hours.

CARL J. HARBERT.